Dec. 17, 1929.  J. R. WYLLIE  1,739,999
HAND LIFT PLATFORM TRUCK
Filed June 7, 1927  2 Sheets-Sheet 1
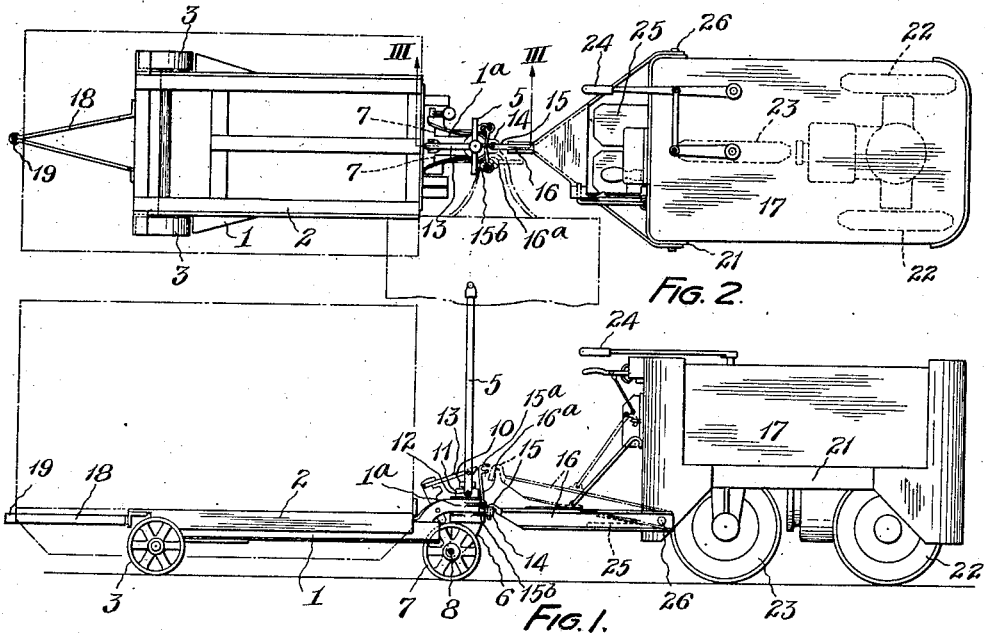
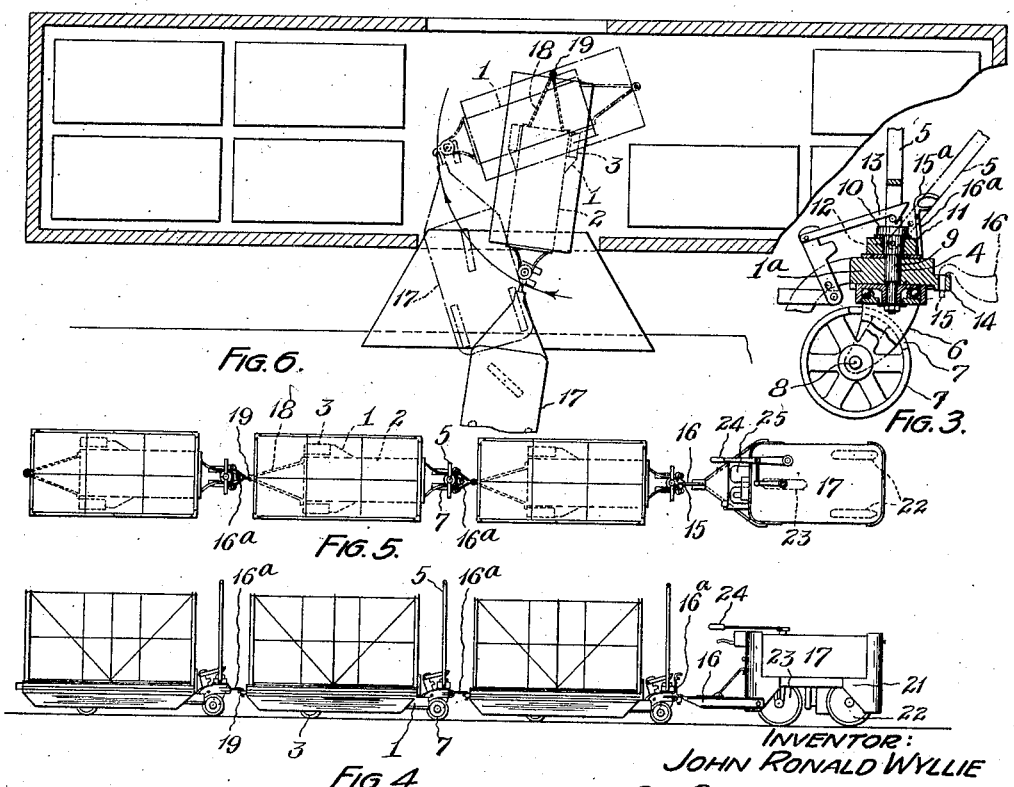
INVENTOR:
JOHN RONALD WYLLIE
BY Markel & Underwood
ATTORNEYS.

Dec. 17, 1929.     J. R. WYLLIE     1,739,999
HAND LIFT PLATFORM TRUCK
Filed June 7, 1927     2 Sheets-Sheet 2

INVENTOR:
JOHN RONALD WYLLIE
BY Merkel & Underwood
ATTORNEYS.

Patented Dec. 17, 1929

1,739,999

UNITED STATES PATENT OFFICE

JOHN RONALD WYLLIE, OF NEW CANAAN, CONNECTICUT, ASSIGNOR TO ANDREWS CRANE CORPORATION, OF NEW YORK, N. Y., A CORPORATION OF DELAWARE

HAND LIFT-PLATFORM TRUCK

Application filed June 7, 1927. Serial No. 197,051.

The invention relates to hand lift-platform trucks.

The ordinary hand lift-platform truck is composed of a frame supported on two rear wheels widely separated, and one front wheel (or two wheels placed quite closely together), connected with a fork mounted to rotate on a vertical axis to which is pivotally connected, on a horizontal axis, a handle by which the truck may be manually moved and the fork and wheels may be turned to steer the truck. A lift-platform is mounted on the frame and mechanical means is so related thereto and to the handle that by pivotal motion of the handle on its horizontal axis the platform may be raised and lowered; all of which is well known. Such trucks are adapted to be connected with a tractor, either singly or in a train, and it is customary to move them from point to point in this way. But the movement of such a truck by means of a tractor is substantially limited to a forward or trailing movement.

In an application filed January 31, 1927, Serial No. 165,010, by me jointly with another, there is disclosed a new method of handling freight which involves the mechanical manipulation of lift-platform trucks including the mechanical insertion of a lift-platform beneath a load, mechanically raising it from the floor or ground and transferring it to the control of the truck, carrying it to a desired point of placement, and there depositing it. This method involves, also, the removal and placement of heavy loads from and into very confined spaces where there is very little space in which to give the necessary directed movement to a loaded truck, for which reason it would be impossible to mechanically manipulate, by means of a tractor, the ordinary hand lift-platform truck whose movement is restricted to merely a steering movement by turning the front wheels, as above pointed out. In many places where mechandise is handled in small volume, power operated lift-platform trucks cannot be economically employed. For this and other reasons a hand lift-platform truck having the utility of those commonly in use with the added utility of adaptation to manipulation by tractor means, is a desideratum, and it is the object of my invention to embody these useful functions in a hand lift-platform truck, by simple means.

The invention consists in the structure and combinations hereinafter described and illustrated, and specifically pointed out in the appended claims.

In the annexed drawings:

Figure 1 is a side elevation of a hand lift-platform truck embodying one form of the invention, engaged with a tractor.

Fig. 2 is a plan view of the construction shown in Fig. 1.

Fig. 3 is a fragmentary vertical cross-section, on an enlarged scale, taken on line III—III of Fig. 2.

Fig. 4 is a side elevation of a train of hand lift-platform trucks connected with a tractor.

Fig. 5 is a top plan view thereof.

Fig. 6 is a diagrammatic plan view of a box car, illustrating the adaptability of my truck, to manipulate a hand lift-platform truck into a confined space in a box car.

Figure 8:
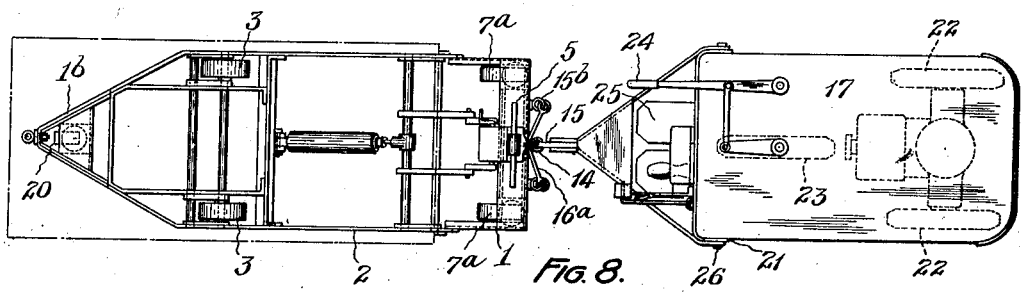
Fig. 8 is a plan view thereof.

A hand lift-platform truck of ordinary construction may be transformed by slight changes and additions to adapt it to be manipulated by a tractor, as above described, and a truck so modified is shown in Figs. 1 to 6. A truck of well-known construction consists of a frame 1, a lift-platform 2 mounted thereon, load-supporting wheels 3 near one end, and one or more supporting wheels at the other end, mounted in a yoke pivoted in an opening extending vertically through the front frame member 1$^a$ in the longitudinal axis of the truck, such as the opening indicated at 4, Fig. 3. According to the prior construction, a handle, such as designated at 5, was pivoted to the forked wheel-mount on a horizontal axis so that by grasping the handle the front wheel could be turned for steering movement, and by pulling on the handle the truck could be moved over its supporting surface. According to my invention I disconnect the handle from the fork on which the front wheel is mounted and substitute a caster for the wheel, so that the caster and handle are independent of each other. The front wheel is therefore changed from a supporting and steering means to a mere caster which serves to support the frame and is adapted to conform readily to any motion imposed upon the truck, and the handle is a pulling means, and also a means to raise the lift-platform, as in prior constructions. In Fig. 3 a caster bracket 6 serves as a mounting for a pair of wheels 7 secured to the respective ends of an axle 8. The bracket is pivotally mounted on a bolt 9 passing through the opening 4, the upper end of which is enlarged into a head 10, and the lower end of which is provided with a nut and washer to hold the bracket in place. Between the head 10 on the bolt and the upper face of the frame member 1$^a$ is a collar 11 rotating freely on the bolt, and the collar is provided with laterally projecting diametrically opposed pins 12 to which is pivoted the handle 5. When the handle is in an upright position, as shown in Fig. 3, it is adapted to engage a hook on the end of a link 13 connected with the lift-platform, by means of which the lift-platform is raised, according to well-known practice. The frame member 1$^a$ is also provided with an eye 14 or other coupling means for connection with a hook 15 on the end of a draw-bar 16 pivotally connected with a tractor 17.

In order further to modify this old hand lift-platform truck to adapt it to my purpose, I rigidly secure a bracket 18 to the rear end of the frame, preferably tapering rearwardly, and provided at its extreme end with an eye 19 or other coupling means, adapted to cooperate with a hook on a drawbar or link connected with a like truck for handling in trains.

Figure 7:
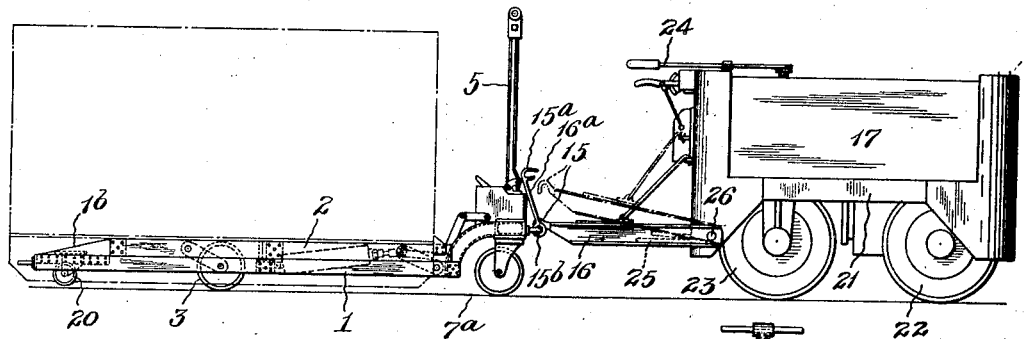
Fig. 7 is a view similar to Fig. 1 showing a different form of truck, connected with a tractor.
Figure 11:
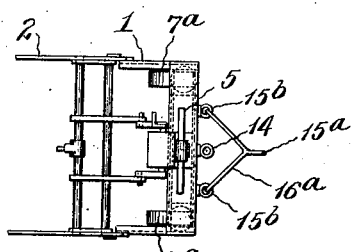
Fig. 11 is a plan view of the front end of the truck.
Figure 10:
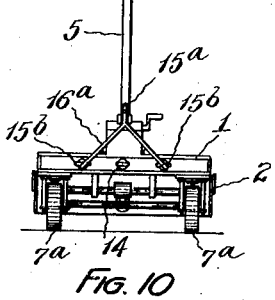
Fig. 10 is a front elevation of this truck.
Figure 9:
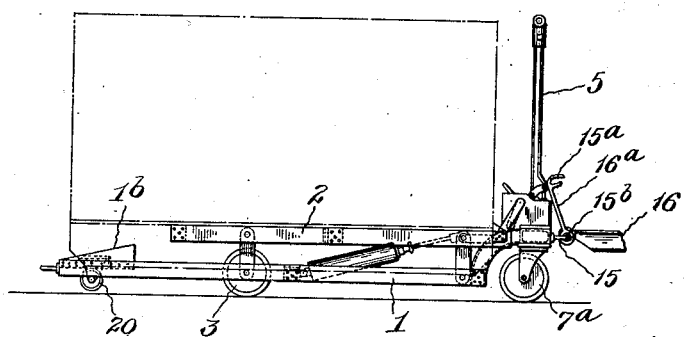
Fig. 9 is a side elevation of this form showing the platform in elevated position, with a load shown in dotted lines.

The form of truck shown in Figs. 7 to 11 is substantially the same except that it involves the incorporation of the ideas above set forth into a truck in the course of manufacture, instead of modifying a truck of old form. In such case the frame of the truck is tapered rearwardly of the load-supporting wheels 3, and is equipped near the extreme end with an additional caster 20. Instead of the centrally arranged caster wheels 7 of the first form at the front end of the frame, I provide two casters 7$^a$ mounted on opposite sides of the longitudinal axis of the truck, which may be as widely separated as the form of the truck frame will permit so as to give a stable support. The front casters, load-supporting wheels and rear caster, are so arranged as to permit the frame to teeter on the load-supporting wheels. By this arrangement the extreme end of the frame serves to support a part of the load, at certain times, and adapts the truck to be used in situations where it would be impossible to employ the form shown in Figs. 1 to 6. For example, where a loaded truck is pushed up an inclined ramp, the caster at the rear end first engages the inclined surface, thereby preventing the container constituting the load from engaging the ramp and stopping further motion, the rear and front casters in such cases affording a stable support for the load during the time the load-supporting wheels are lifted out of contact with the supporting surface by the engagement of the rear caster with the inclined ramp while the front casters are still in engagement with the level surface of the floor. When the load-supporting wheels advance to a position engaging the ramp, the load is again supported by the load-supporting wheels and the two front casters, assuming the load to have been properly positioned on the truck. The rear end of the truck is preferably downwardly tapered, as indicated at 1$^b$ to permit the insertion of the truck beneath a container when approached at an angle to the horizontal. Pivotally connected with the frame of the truck, as indicated at 15$^b$, is a draw-bar 16$^a$ provided at its end with a hook or other coupling means 15$^a$.

Both forms of the truck described are adapted to be handled by a tractor equipped with a suitable coupling member. The prior form of hand lift-platform truck, as above described, was adapted for connection with a tractor, it could be pulled by the tractor, but it was not adapted to be effectively moved by the tractor in any other way. But in order to place a truck with its load into a confined space, such for example, as indicated in Fig. 6, without manual manipulation of any kind, i. e., by manipulating the truck into position by means of a tractor, it is necessary that it be so constructed that one end can be moved laterally, as well as the whole in a general forward or backward direction. Such motion is permitted by the casters, as it is known that casters will conform in position to any movement imposed upon the object which they support. While the hand lift-platform trucks described are adapted for use with any form of tractor they are especially adapted for use with a tractor of novel construction invented jointly by me and another, which forms the subject matter of a concurrently filed application. One form of the novel tractor is shown in the drawings which will now be described in so far only as its peculiar features cooperate with the hand lift-platform truck to which this application is confined.

The tractor 17 is preferably of the storage battery type, and comprises a frame 21 supported by two traction wheels 22 near one end and a single steering wheel 23 near the other end, controlled by a tiller handle 24. On the steering end of the tractor frame is mounted a platform 25 to support an operator, and to this end also is pivotally connected, on a horizontal axis, as indicated at 26, a draw-bar 16, having a hook or other coupling means 15 at its free end, adapted for connection with the coupling means on the truck so as to provide a universal joint. In this type of tractor it is contemplated that the draw-bar 16 shall be of such length that the distance from the axis of the steering wheel 23 to the coupling means at the end of the draw-bar shall be equal to or greater than, the wheel base, in a tractor of ordinary size. It will be obvious that a tractor of this construction can be caused to turn on a center just outside of either of the traction wheels (at an extreme angular setting of the steering wheel) and consequently, that the end of the draw-bar 16 may be swung in a comparatively flat arc. When a truck provided with casters as above described is connected with the draw-bar of such a tractor, it will readily conform to the motion imposed upon it by the tractor; also, by reason of the employment of a draw-bar of the length indicated the truck, with its load, is permitted to assume a position substantially at right angles to the longitudinal axis of the tractor, as indicated in dotted lines in Fig. 2. Thus the substitution of casters for the steering wheel or wheels of the prior hand lift-platform truck adapts it to be pushed or pulled as before, but also adapts its end to be swung by means of a tractor about a center near the outer side of one of the load-supporting wheels. The utility of such adaptability is illustrated in Fig. 6, which shows in full lines, a tractor connected with a loaded truck in a position in front of a narrow space in a box car where it is desired to deposit the load, and, in dotted lines, a succeeding position, alined with such space, brought about simply by properly steering the tractor, which would be impossible of accomplishment with steering wheels on the truck. By a further movement of the tractor the load may be pushed into the space and deposited therein.

From the above description it will be apparent that I have so modified the old form of hand lift-platform truck that, while not interfering with the functions which it previously possessed, it is given decidedly new utilities, in that it may be moved with its load into very confined spaces solely by mechanical manipulation with a tractor.

It is obvious that the principles disclosed may be embodied in different forms, and it is therefore to be understood that my invention is not confined to the details shown, but includes all changes, substitutions and modifications falling within the terms of the appended claims.

What I claim is:

1. In a hand lift-platform truck, a frame tapering toward the rear, a lift-platform thereon, means for supporting the frame comprising intermediate load-supporting wheels and two or more casters spaced from the load-supporting wheels, one of said casters being near the end of the tapered portion of the frame, a handle universally connected with the front end of the frame, means for detachably connecting the handle with the lift-platform to operate the same, and coupling means connected with the front end of the frame.

2. In a hand lift-platform truck, a frame, a lift-platform thereon, a handle universally connected with the front end of the frame, means for detachably connecting the handle with the lift-platform to operate the same, means for supporting the frame comprising casters at the front end of the frame and load-supporting wheels placed rearwardly of said casters, and coupling means connected with the front end of the frame, whereby power means may be applied to the coupling means to push or pull the truck or thrust it laterally.

3. The combination specified in claim 2 with the addition of one or more casters at the rear end of the frame.

4. The combination specified in claim 2 in which the frame is tapered at its rear end.

Signed by me this 12th day of May, 1927.

JOHN RONALD WYLLIE.